INVENTOR
VICTOR H. BALDING
BY Emory L. Groff Jr Atty

United States Patent Office 3,431,635
Patented Mar. 11, 1969

3,431,635
TOOL ENGAGING DEVICE
Victor Horace Balding, Beavers Woods, Ringland Road,
Taverham, Norwich, Norfolk, England
Filed Mar. 7, 1967, Ser. No. 621,288
Claims priority, application Great Britain, Mar. 8, 1966,
10,117/66
U.S. Cl. 29—568                 8 Claims
Int. Cl. B23q 39/02

ABSTRACT OF THE DISCLOSURE

The working tools of a machine tool are each mounted in an arbor and the arbors are arranged to be brought selectively and successively as required into axial alignment with and below the spindle quill of the machine on to a plate support. The plate support and with it the selected tool are then raised so that the top of the arbor enters into a recess in the quill, where it is held by the plate for the working operation. The arbor and spindle nose have co-acting drive means.

Background of the invention

This invention concerns a tool engaging device for machine tools, that is machines having a rotary spindle or quill for holding and driving a tool such as a twist drill, reamer or rotary cutter. The invention concerns machines as above in which means are provided for bringing a selected one of a number of tools in a stored position into position for operative coupling to the spindle.

An object of the invention is to provide an improved arrangement for positively engaging a selected tool for the working operation. Another object of the invention is to provide an arrangement for engaging a selected tool so that said tool is coupled easily and positively and in axial alignment with the spindle without risk of malcoupling or fouling.

A further object is to provide a machine tool which can be programmed, for example by tape control, to perform a series of successive working operations on a workpiece or pieces with the tools brought successively into working co-operation accurately and automatically with the spindle or quill, where they are held firmly and positively.

Summary of the invention

According to the invention, the machine tool has a rotary spindle quill to hold and drive a working tool engaged therein and has means for carrying a store of tools arranged to be brought successively one by one from the store into axial alignment with and below the spindle nose, and each tool is carried by an arbor having a shank at its upper end and the spindle has a complementary recess, said spindle nose and arbor having co-acting driving means so that an arbor turns with the spindle when its shank is within the recess, said machine having a plate support below the spindle nose and means to move a selected arbor with its tool from the store on to the support, means to move the plate with the said tool and arbor upwardly so that the shank enters the recess and the arbor is driven by the spindle, said plate support holding the arbor to the spindle for the working operation.

Preferably the arbor spindle is tapered as is its complementary socket. With the above arrangement the arbor is accurately located by the plate, and is held firmly during the working operation. Conveniently the driving means comprise pins or teeth on the arbor and co-acting pins, teeth or other projections on the spindle nose. The nose also may have recesses into which the arbor teeth engage, the projections on the nose ensuring engagement by relative deflection of the arbor, the projections being shaped to prevent butting engagement with the arbor pins or teeth.

Brief description of the drawings

The accompanying drawings illustrate by way of example, an embodiment of the invention and a modification.

In the drawings.

Description of preferred embodiments

Figure 1:
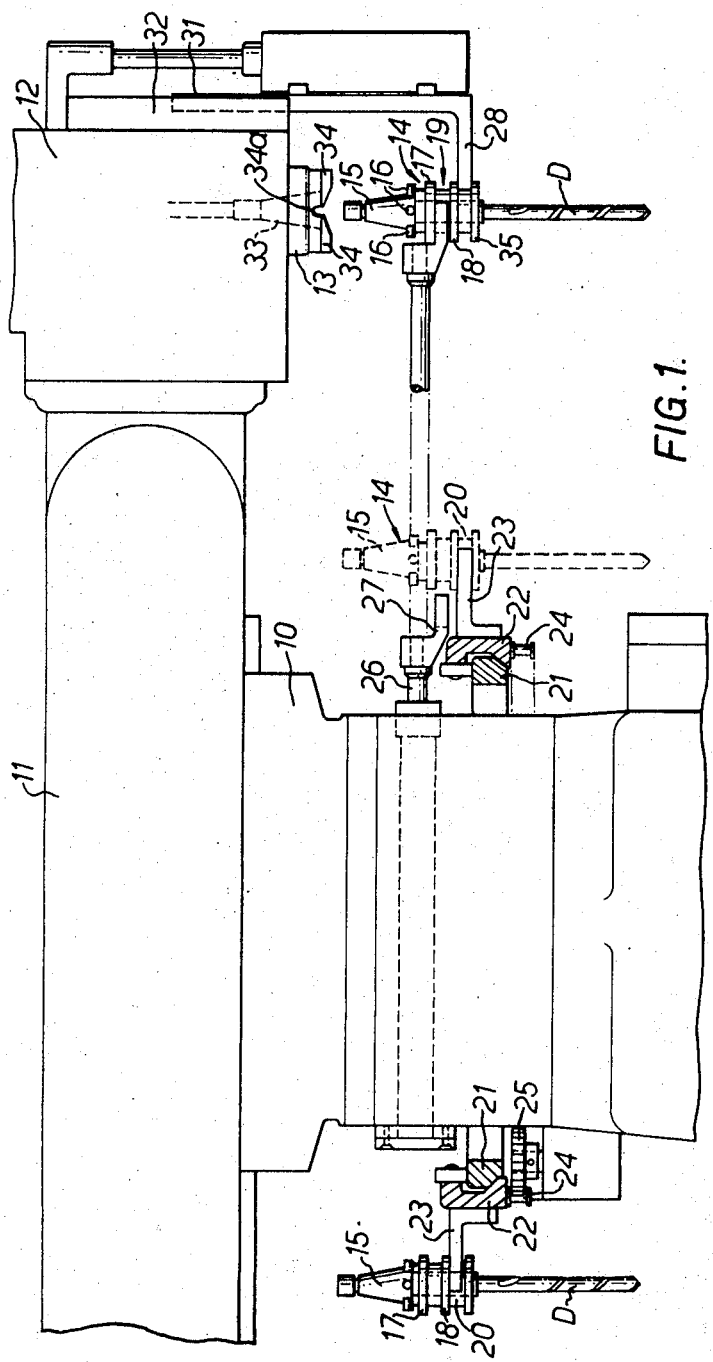
FIGURE 1 is an elevation of a machine tool incorporating the invention, the tool and its holder or arbor being shown in full lines in axial alignment with machine spindle nose and in broken lines mounted on the carrier ring.

As shown in FIGURE 1, the machine tool has a vertical post 10 with a head 11 carrying the housing 12 for the rotary tool driving spindle, the nose 13 of which is shown. The general construction of the machine is conventional, being a vertical drilling or boring machine.

Each tool, such as a twist drill D, is carried by a holder or arbor 14 which has a tapper shank 15 at its upper end, and projections forming teeth or pins 16 at or near the root of the sank part 15. Below the teeth are two spaced-apart circumferential flanges 17, 18, which between them define a space 19. A second space in which is a bearing surface area 20, is below the lower flange 18.

Around the post 10 is a locating ring 21, on which runs a plurality of carriers 22, each having an outwardly extending yoke 23. The carriers are driven by an endless chain 24 and driving wheels, one of which 25, is shown. The driving mechanism itself is such that the chain, and with it the carriers, can be moved step-by-step fashion around the head so that the carriers are brought in succession into the position shown in the broken lines on the right of the head, FIGURE 1. When in such position the holder or arbor and tool is moved away from the head by means of a plunger rod 26 having a gripping head 27 to engage the bearing surface 19 and between the flanges 17, 18, and having a hydraulically operated gripping finger to hold the arbor, the rod 26 being moved out until the axis of the arbor 14 aligns with the axis of the spindle. In this position the support for the arbor and tool is transferred to a horizontal plate 28 formed as a yoke with the limbs 28a, 28a (FIGURES 2 and 3), these limbs passing below the flange 18.

Figure 2:
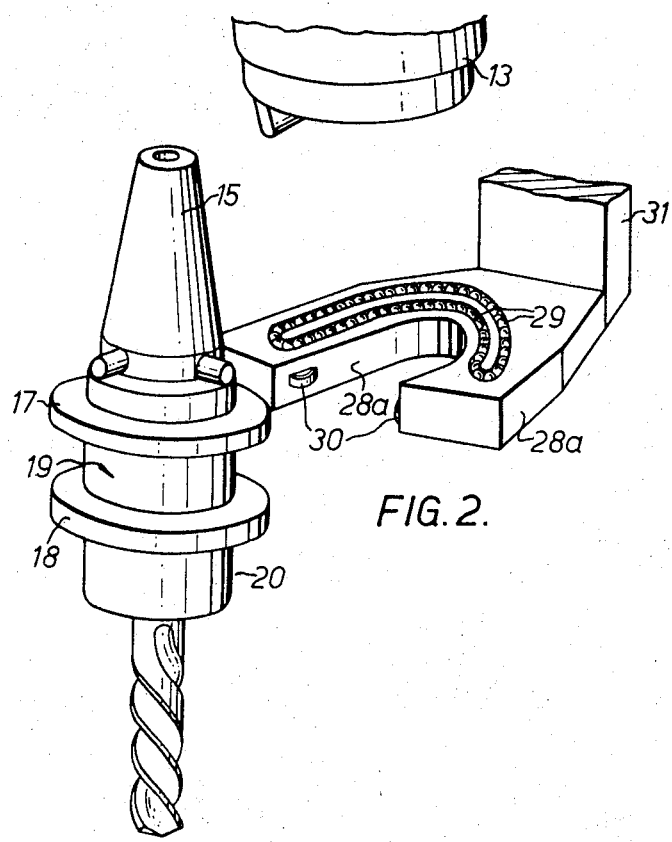
FIGURE 2 is a perspective fragmentary view showing the tool holder or arbor, the yoke for receiving same, and the machine nose.
Figure 3:
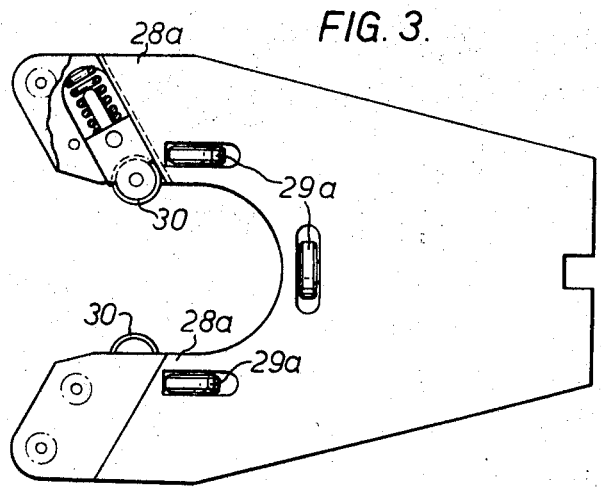
FIGURE 3 is a plan view of an alternative form of yoke.

In the form of plate shown in FIGURE 2, anti-friction means are incorporated, comprising a re-circulating ball-bearing assembly 29 on the top face of the plate and rollers 30, 30, in the bight. In the plate shown in FIGURE 3, anti-friction rollers 29a are provided on the top. The rollers 30, 30, may each be loaded by a spring such as the spring 31 shown in FIGURE 3 to constrain the arbor in the yoke. The plate 28 is carried by a slide 31 mounted in a slideway 32. When an arbor or carrier is in a position below the spindle nose, the gripping device of the head 27 is released and the rod 26 is retracted and the plate 28, and with it the arbor or carrier and its tool, is raised by the upward movement of the slide until the shank 15 is received in a complementary taper socket 33. The nose has projections 34 to co-act with the projections 16. The taper shank and socket ensure centreing of the tool in the spindle. In the construction shown in FIGURE 1, the projections 34 act as guides so that as the arbor shank 15 enters into the socket 33, the projections 16 are guided into recesses 34a for driving co-operation. In the construction of FIGURE 2, the pins 16 engage the projections 34 for driving.

The operation of the slide, the plunger rod and its gripping device, and movement of the arbors or carriers around the head preferably are hydraulically powered, and the sequence can be controlled or programmed automatically, as can the movement and positioning of a workpiece or pieces on to the machine table.

When the arbor or carrier is in position, the tool is driven and the machine tool functions in conventional manner to perform the working operation.

The projections are shaped so that if, on the lifting movement, those on the arbor or carrier should foul those on the spindle nose, the arbor or carrier will be deflected until the pins on the arbor enter the slots (FIGURE 1) or abut the spindle nose (FIGURE 2). Conveniently a flange 35 (FIGURE 1) is provided below the bearing surface 20 to ensure positive detachment of the tool and arbor when the slide moves downwardly after the working operation.

It will be seen that the arbor or carrier is firmly held in the spindle nose by means of the plate 28, which constitutes a clamp, the friction on the plate surface and the bearing surface 20 being minimal due to the anti-friction means. The arrangement enables a tool to be changed and driven automatically.

After the working operation, the arbor and tool are lowered, the rod 26 moves out and its gripping head engages and holds the bearing surface 19, and the arbor is returned to its carrier.

The invention is not restricted to use on the precise form of tool changing mechanism illustrated. It could be used on other such mechanisms where tools are to be brought successively into engagement with a driving spindle, chuck or the like.

I claim:

1. A machine tool having a rotary spindle quill to hold and drive a working tool engaged therein and having means for carrying a store of tools arranged to be brought successively one by one from the store into axial alignment with and below the spindle nose, wherein each tool is carried by an arbor having a shank at its upper end and the spindle has a complementary recess, said spindle nose and arbor having co-acting driving means so that an arbor turns with the spindle when its shank is within the recess, said machine having a plate support below the spindle nose and means to move a selected arbor with its tool from the store on to the support, means to move the plate with the said tool and arbor upwardly so that the shank enters the recess and the arbor is driven by the spindle, said plate support holding the arbor to the spindle for the working operation.

2. A machine tool as claimed in claim 1, wherein the shank is tapered and the recess is complementarily tapered.

3. A machine tool as claimed in claim 1, wherein the projections on the arbor comprise pins and the projections on the spindle nose guide the said pins into recesses in the nose.

4. A machine tool as claimed in claim 1, wherein the support comprises a yoke, and each arbor has a part to be received therein.

5. A machine tool as claimed in claim 4, wherein each arbor has a circumferential flange to seat on the upper surface of the support plate, the said surface and the bight of the yoke in which the arbor is received having anti-friction means for the running of the flange on the said plate surfaces and the surface of the arbor in the bight.

6. A machine tool as claimed in claim 5, wherein a flange is provided below the surface of the arbor in the bight to ensure positive detachment of the arbor from the spindle when the plate is lowered.

7. A machine tool as claimed in claim 1, having an endless chain or belt mounted on the machine, a plurality of carriers each for an arbor, which carriers are spaced apart around the chain or belt, means for driving said chain or belt step-by-step fashion to bring the carriers successively into a position for the transfer of an arbor from the chain or belt on to the plate support, and transfer means carried by the machine for the transfer of the arbor on to the plate member.

8. A machine tool as claimed in claim 7, wherein the plate support is carried by a slide mounted on a slideway to move in a direction parallel with the axis of the spindle.

References Cited

UNITED STATES PATENTS

| | | | |
|---|---|---|---|
| 3,370,346 | 2/1968 | Lehmkuhl et al. | 29—568 |
| 3,288,032 | 11/1966 | Pankonin et al. | 29—568 |

RICHARD H. EANES, Jr., *Primary Examiner.*